(12) United States Patent
Mishima

(10) Patent No.: US 10,680,480 B2
(45) Date of Patent: Jun. 9, 2020

(54) MOTOR

(71) Applicant: FANUC CORPORATION, Yamanashi (JP)

(72) Inventor: Yamato Mishima, Yamanashi (JP)

(73) Assignee: FANUC CORPORATION, Yamanash (JP)

( * ) Notice: Subject to any disclaimer, the term of this patent is extended or adjusted under 35 U.S.C. 154(b) by 32 days.

(21) Appl. No.: 15/941,101

(22) Filed: Mar. 30, 2018

(65) Prior Publication Data

US 2018/0287446 A1   Oct. 4, 2018

(30) Foreign Application Priority Data

Apr. 4, 2017   (JP) ................. 2017-074675

(51) Int. Cl.
*H02K 15/12*   (2006.01)
*H02K 5/04*   (2006.01)
(Continued)

(52) U.S. Cl.
CPC ............. *H02K 3/32* (2013.01); *H02K 3/28* (2013.01); *H02K 5/04* (2013.01); *H02K 15/12* (2013.01); *H02K 5/15* (2013.01)

(58) Field of Classification Search
CPC .. H02K 5/04; H02K 5/20; H02K 5/18; H02K 5/22; H02K 5/225; H02K 5/24;
(Continued)

(56) References Cited

U.S. PATENT DOCUMENTS 1,626,028 A * 4/1927 Daun .................. H02K 1/185
                                                310/216.127
4,402,383 A * 9/1983 Bailey .................. H02K 5/24
                                                173/162.1
(Continued)

FOREIGN PATENT DOCUMENTS

CN   101728890 A   6/2010
CN   207968141 U   10/2018
(Continued)

OTHER PUBLICATIONS

DE-102011082461-A1 (English Translation) (Year: 2012).*
(Continued)

*Primary Examiner* — Alfonso Perez Borroto
*Assistant Examiner* — Alexander Moraza
(74) *Attorney, Agent, or Firm* — Studebaker & Brackett PC

(57) ABSTRACT

A housing portion includes: an end surface portion that is arranged on one end side; an inside surface portion that is formed so as to be extended from the end surface portion to the other end side; an opening portion that is arranged so as to be aligned with the inside surface portion and that makes a second internal space formed with the end surface portion and the inside surface portion and an external space communicate with each other; a first protrusion portion that is formed so as to be protruded from the inside surface portion toward the side and that is formed so as to be inclined to one side; and a second protrusion portion that is formed so as to be protruded from the inside surface portion toward the side of the rotary axis and that is formed so as to be inclined to the other side.

9 Claims, 10 Drawing Sheets

(51) Int. Cl.
*H02K 5/15* (2006.01)
*H02K 3/32* (2006.01)
*H02K 3/28* (2006.01)

(58) Field of Classification Search
CPC .......... H02K 1/185; H02K 1/18; H02K 15/12; H02K 15/14; H02K 5/15
USPC .............................. 310/89, 64, 418, 400–417
See application file for complete search history.

(56) References Cited

U.S. PATENT DOCUMENTS

| | | | | |
|---|---|---|---|---|
| 5,327,036 A | * | 7/1994 | Carey | H02K 5/20 310/51 |
| 2004/0084981 A1 | * | 5/2004 | Ortt | H02K 5/00 310/89 |
| 2004/0178692 A1 | * | 9/2004 | Wright | H02K 5/15 310/216.004 |
| 2009/0026893 A1 | * | 1/2009 | Zisler | H02K 5/20 310/60 A |
| 2012/0206022 A1 | * | 8/2012 | Wilson, Jr. | H02K 5/06 310/401 |
| 2015/0222160 A1 | * | 8/2015 | Lee | H02K 9/14 310/58 |
| 2017/0313283 A1 | * | 11/2017 | Kojima | B60S 1/08 |

FOREIGN PATENT DOCUMENTS

| | | | | |
|---|---|---|---|---|
| DE | 10207310 A1 | * | 9/2003 | ............. H02K 1/185 |
| DE | 102011082461 A1 | * | 12/2012 | ............. H02K 1/185 |
| JP | S59-032335 A | | 2/1984 | |
| JP | S60-005758 A | | 1/1985 | |
| JP | S62-053151 A | | 3/1987 | |
| JP | H06-133477 A | | 5/1994 | |
| JP | H07-163083 A | | 6/1995 | |
| JP | H09-66258 A | | 3/1997 | |
| JP | 4109223 B2 | | 7/2008 | |

OTHER PUBLICATIONS

DE-10207310-A1 (English Translation) (Year: 2003).*
An Office Action mailed by the State Intellectual Property Office of the People's Republic of China dated Feb. 2, 2019, which corresponds to Chinese Patent Application No. 201810269787.X and is related to U.S. Appl. No. 15/941,101.

* cited by examiner

MOTOR

This application is based on and claims the benefit of priority from Japanese Patent Application No. 2017-074675, filed on 4 Apr. 2017, the content of which is incorporated herein by reference.

BACKGROUND OF THE INVENTION

Field of the Invention

The present invention relates to a motor which can reduce the leakage of an impregnant.

Related Art

Conventionally, in a motor, in order to enhance the insulation, the heat resistance and the strength of a stator, an insulating varnish (impregnant) is impregnated between windings in the winding portion of the stator. As a method of impregnating the insulating varnish into the winding portion, for example, a method is known in which the stator is immersed into a chamber where the insulating varnish is stored and in which the varnish is impregnated between the windings.

Disadvantageously, however, in a method of immersing the stator into the chamber where the insulating varnish is stored, since the insulating varnish is dried in a stationary state, a large amount of insulating varnish is adhered to a coil end on one side (lower side), and the amount thereof adhered to a coil end on the upper side is lowered. Since the insulating varnish is adhered to a jig on which the stator is mounted, for example, it is necessary to remove it, with the result that the productivity may be adversely affected.

On the other hand, a method of dropping the insulating varnish into the winding portion so as to impregnate it is known. For example, a technology is proposed in which before a housing is attached to both ends of the stator, the stator is inclined, and in which while the stator is being rotated, the insulating varnish is dropped (see, for example, Patent Document 1). Disadvantageously, however, in this technology, the insulating varnish drips from the winding portion so as to soil the surroundings.

A technology is also known in which after the housing is attached to both ends of the stator, while the stator is being rotated, the insulating varnish is dropped. However, in this technology, the insulating varnish may flow from the end portion of the winding portion to the side of the housing so as to flow out from a wiring opening portion formed in the housing to the outside.

On the other hand, for example, a technology is proposed in which a sheet member arranged on an outer circumferential portion of the winding is bent so as to be deformed along the outer shape of the winding portion, in which the insulating varnish that is not able to be impregnated into the winding portion is brought into a state where the insulating varnish is easily held between the winding portion and the sheet member, and in which a wall portion is formed between the stator and the wiring opening portion (see, for example, Patent Document 2).

Patent Document 1: Japanese Unexamined Patent Application, Publication No. H09-66258

Patent Document 2: Japanese Patent No. 4109223

SUMMARY OF THE INVENTION

However, in the technology disclosed in Patent Document 2, since the step of deforming the sheet member along the outer shape of the winding portion is additionally provided, it is likely that an operational burden is increased, and that the productivity is lowered. It is also likely that in a portion wrapped with the sheet member, heat is not easily released, and that thus the liquid insulating varnish is prevented from being solidified. Moreover, when the amount of insulating varnish dropped and the rotation speed in the dropping impregnation are not appropriate, the insulating varnish may flow out from the wiring opening portion to the outside beyond the deformed sheet member and the wall portion.

Furthermore, although the direction of rotation of the stator when the insulating varnish is dropped differs depending on a manufacturing device or the like, a technology is required which copes with the problem described above and which can also cope with the problem described above even in both forward and reverse rotations.

An object of the present invention is to provide a motor which includes a housing that can reduce the leakage of an impregnant dropped into a winding portion.

(1) A motor (for example, a motor 1 which will be described later) includes: a cylindrical stator (for example, a stator 2 which will be described later) that includes: a cylindrical first internal space (for example, a first internal space 21 which will be described later); and a plurality of winding portions (for example, winding portions 20 which will be described later) which are arranged so as to form an outer circumference of the first internal space; a rotor (for example, a rotor 3 which will be described later) that includes: a rotary axis portion (for example, a rotary axis portion 31 which will be described later) which can be rotated about a rotary axis (for example, a rotary axis X which will be described later) and which is arranged along the rotary axis; and a rotary main body portion at least part of which is arranged in the first internal space of the stator (for example, a stator 2 which will be described later); and a housing portion (for example, a housing portion 10 which will be described later) that is arranged on one end side of the stator in a rotary axis direction (for example, a rotary axis direction DX which will be described later) in which the rotary axis is extended, where the housing portion includes: an end surface portion (for example, an end surface portion 118 which will be described later) that is arranged on the one end side in the rotary axis direction perpendicularly to the rotary axis; an inside surface portion (for example, an inside surface portion 120 which will be described later) that is formed so as to be extended from the end surface portion to the other end side in the rotary axis direction and that is arranged about the rotary axis in an annular direction (for example, an annular direction C which will be described later) either continuously or intermittently; an opening portion (for example, a wiring opening portion 110 which will be described later) that is arranged so as to be aligned with part of the inside surface portion in the annular direction and that makes a second internal space (for example, a second internal space 115 which will be described later) formed with the end surface portion and the inside surface portion and an external space communicate with each other; a first protrusion portion (for example, a first protrusion portion 130 which will be described later) that is formed so as to be protruded from the inside surface portion toward the side of the rotary axis and that is formed so as to be inclined to one side in the annular direction with respect to a radial direction (for example, a radial direction DR which will be described later) perpendicular to the rotary axis direction; and a second protrusion portion (for example, a second protrusion portion 140 which will be described later) that is formed so as to be protruded from the inside surface portion toward the side of the rotary axis and that is formed so as to be inclined to the other side in the annular direction with respect to the radial direction.

(2) In the motor according to (1), the first protrusion portion may be arranged in a position relationship in which at least part of a first inner surface (for example, a first inner surface 131 which will be described later) that is an inclined side surface intersects the inside surface portion at an acute angle, and the second protrusion portion may be arranged in a position relationship in which at least part of a second inner surface (for example, a second inner surface 141 which will be described later) that is an inclined side surface intersects the inside surface portion at an acute angle.

(3) The motor according to (2), may further include: a first reservoir portion (for example, a first reservoir portion 135 which will be described later) that is formed between the first inner surface and the inside surface portion; and a second reservoir portion (for example, a second reservoir portion 145 which will be described later) that is formed between the second inner surface and the inside surface portion.

(4) In the motor according to any one of (1) to (3), the first protrusion portion and the second protrusion portion may be arranged so as to sandwich the opening portion, the first protrusion portion may be inclined to an opposite side to the opening portion with respect to the radial direction and the second protrusion portion may be inclined to the opposite side to the opening portion with respect to the radial direction.

(5) The motor according to any one of (1) to (4), may include: a plurality of combinations of the first protrusion portion and the second protrusion portion that is arranged so as to be aligned with the first protrusion portion in the annular direction, where the first protrusion portion in the combination may be inclined to the side of the second protrusion portion with respect to the radial direction, and the second protrusion portion in the combination may be inclined to the side of the first protrusion portion with respect to the radial direction.

(6) The motor according to any one of (1) to (5), may further include: a third protrusion portion (for example, a third protrusion portion 430 which will be described later) that is arranged on a center side in the radial direction with respect to the first protrusion portion (for example, a first protrusion portion 330 which will be described later), that is formed so as to be protruded toward the side of the rotary axis and that is formed so as to be inclined to the same side as the first protrusion portion with respect to the radial direction; and a fourth protrusion portion (for example, a fourth protrusion portion 440 which will be described later) that is arranged on the center side in the radial direction with respect to the second protrusion portion (for example, second protrusion portion 340 which will be described later), that is formed so as to be protruded toward the side of the rotary axis and that is formed so as to be inclined to the same side as the second protrusion portion with respect to the radial direction.

According to the present invention, it is possible to provide a motor which includes a housing that can reduce the leakage of an impregnant dropped into a winding portion.

DETAILED DESCRIPTION OF THE INVENTION

Embodiments of the present invention will be described in detail below with reference to drawings. In the description of the second to fourth embodiments, the same configurations as in the first embodiment are identified with the same symbols, the corresponding configurations are identified with the corresponding symbols having the same regularity and the description thereof will be omitted.

First Embodiment

Figure 1:
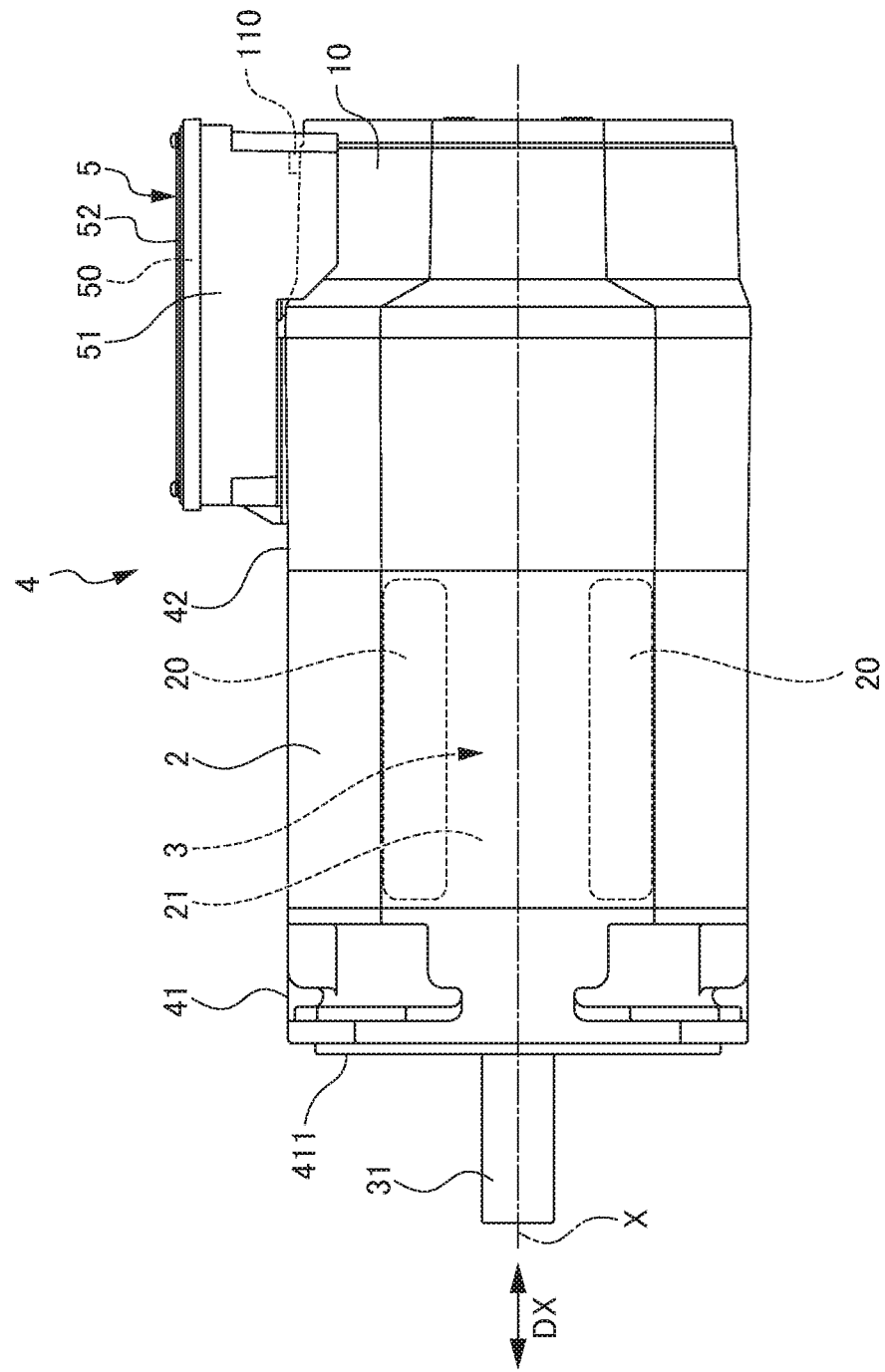
FIG. 1 is a side view of a motor according to a first embodiment.
Figure 2:
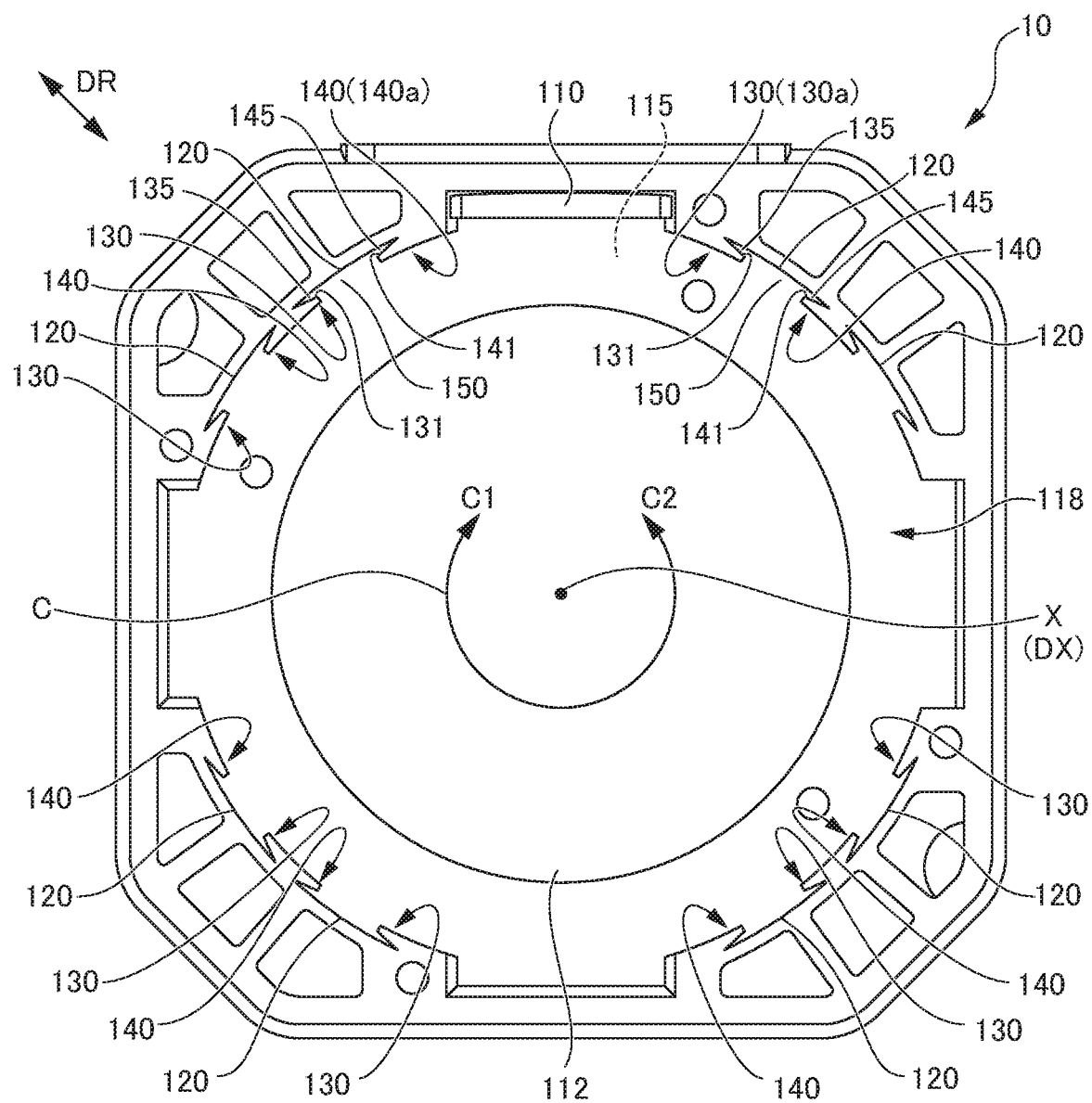
FIG. 2 is a plan view of a housing portion according to the first embodiment.
Figure 3:
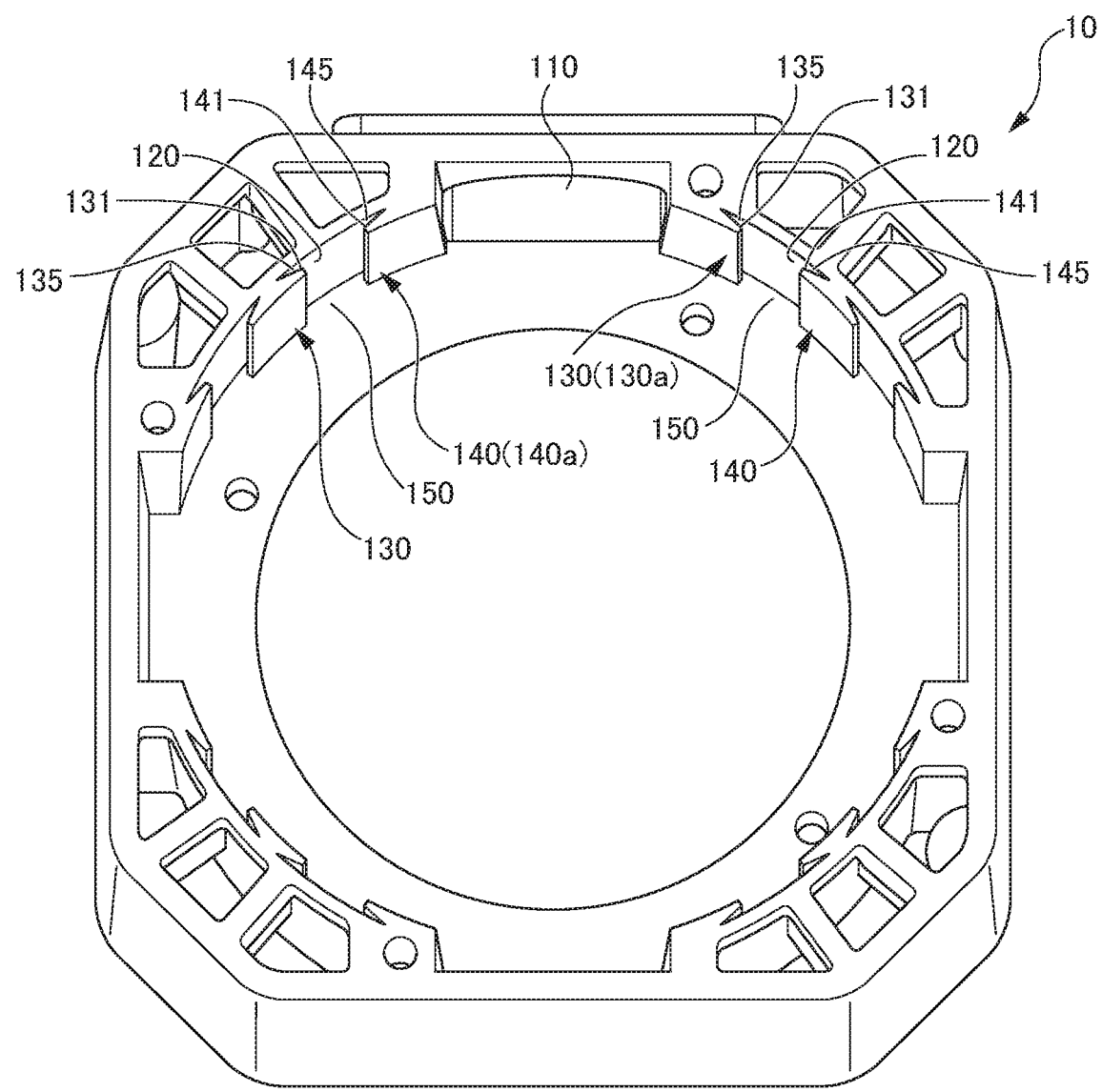
FIG. 3 is a perspective view of the housing portion according to the first embodiment.

A motor according to the first embodiment will be described with reference to FIGS. 1 to 3. FIG. 1 is a side view of the motor according to the first embodiment. FIG. 2 is a plan view of a housing portion according to the first embodiment. FIG. 3 is a perspective view of the housing portion according to the first embodiment. Here, a rotary axis direction DX means a direction in which in the rotary axis portion 31 of a rotor 3 described later, a rotary axis X is extended. A forward side in the rotary axis (the other end side in the rotary axis direction DX) means, for example, the left side in FIG. 1. A backward side in the rotary axis (one end side in the rotary axis direction DX) means, for example, the right side in FIG. 1. An annular direction C means the circumferential direction of an annular ring formed by an inside surface portion 120 described later, and in other words, the annular direction C is the circumferential direction of a circle with the rotary axis X serving as a center axis.

The motor 1 according to the present embodiment is, for example, an inductive motor, and is operated by electromagnetic induction action from a plurality of winding portions 20 arranged in a stator 2 described later to an unillustrated short-circuited bare conductor arranged in the rotor 3. The inductive motor is simple in structure and is easy to maintain so as to be utilized widely.

As shown in FIG. 1, the motor 1 includes the stator 2, the rotor 3, a case portion 4 and a terminal box 5.

The stator 2 is cylindrical, and includes a cylindrical first internal space 21 and a plurality of winding portions 20 which are arranged so as to form the outer circumference of the first internal space 21. The stator 2 is formed with a plurality of magnetic steel plates stacked in layers in the rotary axis direction DX. In the circumferential wall portion of the stator 2, a plurality of unillustrated slots arranged at regular intervals in the circumferential direction are formed.

The slots are provided so as to be extended in the axial direction of the stator 2. In the slots, the winding portions 20 are stored.

Here, an impregnant such as an insulating varnish is impregnated into the winding portions 20. In a state where a housing portion 10 described later is attached to the stator 2, the impregnant is dropped into the winding portions 20. In a state where the stator 2 is rotated about the rotary axis X, the impregnant is dropped into the winding portions 20. The amount of impregnant dropped and the rotation speed of the stator 2 are adjusted by the viscosity of the impregnant, the size of the stator 2 and the like so as to be appropriate. When the impregnant flows to the side of the housing portion 10, in the housing portion 10, first protrusion portions 130 and second protrusion portions 140 described later are formed such that the impregnant is prevented from flowing from a wiring opening portion 110 (described later) to an external space. The configuration of the housing portion 10 will be described in detail later.

The rotor 3 includes an unillustrated rotary main body portion and a rotary axis portion 31. The rotor 3 is a member which can be rotated about the rotary axis X. The rotary main body portion is formed in the shape of a cylinder, and is arranged coaxially with the rotary axis portion 31. The rotary main body portion is fixed to the rotary axis portion 31. In the rotary main body portion, the unillustrated short-circuited bare conductor is arranged. At least part of the rotary main body portion is arranged in the first internal space 21 of the stator 2. The rotary main body portion is arranged so as to be able to be rotated about the rotary axis X. The rotary axis portion 31 is arranged along the rotary axis X. The rotary axis portion 31 is rotated integrally with the rotary main body portion. The other side (the left side in FIG. 1) of the rotary axis portion 31 in the rotary axis direction DX is connected to an unillustrated machine tool.

The case portion 4 includes a first case portion 41, a second case portion 42 and the housing portion 10. The first case portion 41 is arranged on the forward side of the stator 2 in the axial direction (the other end side in the rotary axis direction DX). An unillustrated spindle head in the machine tool is connected to a spindle attachment surface 411 of the first case portion 41 on the forward side in the axial direction.

The second case portion 42 is arranged on the backward side of the stator 2 in the axial direction (one end side in the rotary axis direction DX). The second case portion 42 supports the rotary axis portion 31 of the rotor 3 therewithin. The housing portion 10 is arranged on the backward side of the second case portion 42 in the axial direction (the one end side in the rotary axis direction DX).

The housing portion 10 is arranged on the backward side of the second case portion 42 in the axial direction (the one end side in the rotary axis direction DX). The housing portion 10 includes a plurality of first protrusion portions 130 and second protrusion portions 140 for reducing the leakage of the impregnant dropped into the winding portions 20 of the stator 2. The configuration of the housing portion 10 will be described in detail later.

The terminal box 5 is attached to the upper surfaces of the second case portion 42 and the housing portion 10. The terminal box 5 stores a terminal block 50 therewithin. The terminal box 5 includes a box portion 51 and a lid portion 52. The box portion 51 is a box member which is rectangular in plan view, and its upper surface is opened. The lid portion 52 is a plate member which is rectangular in plan view, and is arranged so as to block the opening of the box portion 51. The lid portion 52 is fixed to the upper end surface of the box portion 51. The outgoing wires (wires) of the individual phases of the windings arranged in the stator 2 are guided into the terminal box 5. The tips of the outgoing wires are electrically connected to a conductive plate (unillustrated). Here, the outgoing wires (wires) are passed through the wiring opening portion 110 formed in the housing portion 10 and are guided into the terminal box 5.

The housing portion 10 will be described in detail with reference to FIGS. 2 and 3. As shown in FIGS. 2 and 3, the housing portion 10 includes an end surface portion 118, an axis side opening portion 112, the inside surface portion 120, a second internal space 115, the wiring opening portion 110 (opening portion), a plurality of first protrusion portions 130 and a plurality of second protrusion portions 140. The housing portion 10 also includes a plurality of inflow ports 150, a plurality of first reservoir portions 135 and a plurality of second reservoir portions 145.

The end surface portion 118 is an end surface which is arranged on the one end side in the rotary axis direction DX so as to be perpendicular to the rotary axis X. In the end surface portion 118, the axis side opening portion 112 is formed. The end surface portion 118 forms the second internal space 115 together with the inside surface portion 120 described later.

The axis side opening portion 112 is an opening portion which is formed in the end surface portion 118. The axis side opening portion 112 is formed in a center portion including the rotary axis X. The axis side opening portion 112 is the opening portion into which a nozzle or the like for dropping the impregnant can be inserted when the impregnant is dropped into the winding portions 20.

The inside surface portion 120 is formed so as to be extended from the end surface portion 118 to the other end side in the rotary axis direction DX (the left side in FIG. 1), and is arranged about the rotary axis X in the annular direction C either continuously or intermittently. The inside surface portion 120 forms the second internal space 115 described later together with the end surface portion 118. On the inside surface portion 120, the first protrusion portions 130 and the second protrusion portions 140 are formed which are protruded in a direction toward the rotary axis X of radial directions DR in the annular ring.

The second internal space 115 is a space which is formed with the end surface portion 118 and the inside surface portion 120. The second internal space 115 communicates with the external space through the wiring opening portion 110.

The wiring opening portion 110 is arranged so as to be aligned with part of the inside surface portion 120 in the annular direction C. The wiring opening portion 110 is an opening portion which makes the second internal space 115 communicates with the external space. The outgoing wires (wires) described above are inserted through the wiring opening portion 110. For example, in a technology which does not include the first protrusion portions 130 and the second protrusion portion 140 in the present invention, when the impregnant dropped into the winding portions 20 is, for example, excessive, the wiring opening portion 110 is a portion through which the impregnant flowing out from the upper surface of the winding portions 20 may flow to the outside.

A plurality of (in the present embodiment, eight) first protrusion portions 130 are individually formed so as to be protruded from the inside surface portion 120 toward the side of the rotary axis X, and are individually formed so as to be inclined to one side in the annular direction C with respect to the radial direction DR perpendicular to the rotary axis X. The first protrusion portions 130 are individually formed so as to be inclined to the side of a clockwise direction C1 in the annular direction C. The "clockwise direction" is, as shown in FIG. 2, a clockwise direction when the one end side is seen from the other end side in the rotary axis direction DX.

The first protrusion portion 130 is arranged in a position relationship in which at least part of a first inner surface 131 that is an inclined side surface intersects the inside surface portion 120 at an acute angle. Between at least part of the first inner surface 131 and the inside surface portion 120, the first reservoir portion 135 described later is formed.

The first protrusion portion 130 is a portion for reducing the leakage of the impregnant dropped into the winding portions 20 in the stator 2. The first protrusion portion 130 is the portion which restricts the movement of (stores) the impregnant that flows when the stator 2 is rotated in the clockwise direction C1 of the annular direction C. The first protrusion portion 130 reduces, together with the second protrusion portion 140, the flow of the impregnant out to the outside.

A plurality of (in the present embodiment, eight) second protrusion portions 140 are individually formed so as to be protruded from the inside surface portion 120 toward the side of the rotary axis X, and are individually formed so as to be inclined to the other side in the annular direction C with respect to the radial direction DR perpendicular to the rotary axis X. The second protrusion portions 140 are individually formed so as to be inclined in an opposite direction (counterclockwise direction C2) to the clockwise direction C1 of the annular direction C.

The second protrusion portion 140 is arranged in a position relationship in which at least part of a second inner surface 141 that is an inclined side surface intersects the inside surface portion 120 at an acute angle. Between at least part of the second inner surface 141 and the inside surface portion 120, the second reservoir portion 145 described later is formed.

The second protrusion portion 140 is a portion for reducing the leakage of the impregnant dropped into the winding portions 20 in the stator 2. The second protrusion portion 140 is the portion which restricts the movement of (stores) the impregnant that flows when the stator 2 is rotated in the opposite direction (counterclockwise direction C2) to the clockwise direction C1 of the annular direction C. The second protrusion portion 140 reduces, together with the first protrusion portion 130, the flow of the impregnant out to the outside.

The first reservoir portion 135 is formed between at least part of the first inner surface 131 and the inside surface portion 120. The first reservoir portion 135 is a portion which stores the impregnant stopped by the first protrusion portion 130. In other words, the first reservoir portion 135 is the portion which stores the impregnant that flows in through the inflow port 150 described later.

The second reservoir portion 145 is formed between at least part of the second inner surface 141 and the inside surface portion 120. The second reservoir portion 145 is a portion which stores the impregnant stopped by the second protrusion portion 140. In other words, the second reservoir portion 145 is the portion which stores the impregnant that flows in through the inflow port 150 described later.

Here, in the present embodiment, the first protrusion portion 130a and the second protrusion portion 140a are arranged in the vicinity of the wiring opening portion 110 so as to sandwich the wiring opening portion 110. The first protrusion portion 130a and the second protrusion portion 140a are formed in such suitable places as to reduce the flow of the impregnant to the wiring opening portion 110.

The first protrusion portion 130a is inclined to the opposite side to the wiring opening portion 110 with respect to the radial direction DR. The second protrusion portion 140a is inclined to the opposite side to the wiring opening portion 110 with respect to the radial direction DR. In other words, the first protrusion portion 130a and the second protrusion portion 140a are formed so as to reduce the flow of the impregnant to the side of the wiring opening portion 110. The first protrusion portion 130a and the second protrusion portion 140a are formed so as to reduce the flow of the impregnant even when the stator 2 is rotated in any one of forward and reverse directions. The first protrusion portion 130a and the second protrusion portion 140a are formed like a so-called return or flange portion such that the impregnant is prevented from flowing to the side of the wiring opening portion 110.

In the present embodiment, the housing portion 10 includes a plurality of combinations of the first protrusion portion 130 and the second protrusion portion 140 which is arranged so as to be aligned with the first protrusion portion 130 in the annular direction C. The housing portion 10 includes eight combinations of the first protrusion portion 130 and the second protrusion portion 140 which are inclined so as to face each other in the annular direction C.

The first protrusion portion 130 in the combination is formed so as to be inclined to the side of the second protrusion portion 140 with respect to the radial direction DR. The second protrusion portion 140 in the combination is formed so as to be inclined to the side of the first protrusion portion 130 with respect to the radial direction DR. The first protrusion portion 130 and the second protrusion portion 140 in the combination are formed so as to restrict the flow of the impregnant even when the stator 2 is rotated in any one of forward and reverse directions, and are formed so as to store the impregnant in a space formed with the first inner surface 131, the second inner surface 141 and the inside surface portion 120.

In other words, the impregnant which flows in through the inflow port 150 formed between the tip portions of the first protrusion portion 130 and the second protrusion portion 140 in the combination is stored in the first reservoir portion 135 and the second reservoir portion 145, and is restricted from flowing out from the inflow port 150 to the side of the second internal space 115.

Here, in the present embodiment, since the housing portion 10 includes the combinations (eight combinations), the impregnant flowing out to the side of the housing portion 10 can be held in the place from which the impregnant flows out, the impregnant is restricted from being moved along the inside surface portion 120 to the side of the wiring opening portion 110 and the accumulation of the impregnant can be reduced.

According to the present embodiment, the following effects are produced. According to the present embodiment, it is possible to provide the motor 1 which includes the housing portion 10 that can reduce the leakage of the impregnant dropped into the winding portions 20. According to the present embodiment, it is possible to provide the motor 1 which includes the housing portion 10 that can reduce the leakage of the impregnant dropped into the winding portions 20 regardless of the direction of the rotation when the impregnant is dropped.

In the motor 1 of the present embodiment, the housing portion 10 includes: the end surface portion 118 that is arranged on one end side in the rotary axis direction DX perpendicularly to the rotary axis X; the inside surface portion 120 that is formed so as to be extended from the end surface portion 118 to the other end side in the rotary axis direction DX and that is arranged about the rotary axis X in the annular direction C either continuously or intermittently; the wiring opening portion 110 that is arranged so as to be aligned with part of the inside surface portion 120 in the annular direction (C) and that makes the second internal space 115 formed with the end surface portion 118 and the inside surface portion 120 communicate with the external space; the first protrusion portion 130 that is formed so as to be protruded from the inside surface portion 120 toward the side of the rotary axis X and that is formed so as to be inclined to one side in the annular direction C with respect to the radial direction DR perpendicular to the rotary axis direction DX; and the second protrusion portion 140 that is formed so as to be protruded from the inside surface portion 120 toward the side of the rotary axis X and that is formed so as to be inclined to the other side in the annular direction C with respect to the radial direction DR.

Hence, in the present embodiment, it is possible to restrict the movement of the impregnant dropped into the winding portions 20 in the annular direction C. In this way, it is possible to reduce the flow of the impregnant out to the outside of the wiring opening portion 110.

In the present embodiment, the first protrusion portion 130 which is inclined to the one side in the annular direction C and the second protrusion portion 140 which is inclined to the other side are formed. In this way, the motor 1 (the housing portion 10) suitably restricts the movement of the impregnant in the annular direction C, and suitably restricts the flow of the impregnant even when the motor 1 (the stator 2) is moved in any one of forward and reverse directions.

In the motor 1 of the present embodiment, the first protrusion portion 130 is arranged in a position relationship in which at least part of the first inner surface 131 that is an inclined side surface intersects the inside surface portion 120 at an acute angle, and the second protrusion portion 140 is arranged in a position relationship in which at least part of the second inner surface 141 that is an inclined side surface intersects the inside surface portion 120 at an acute angle.

Hence, in the present embodiment, the motor 1 (the housing portion 10) suitably restricts the movement of the impregnant in the annular direction C, and suitably restricts the flow of the impregnant even when the motor 1 (the stator 2) is moved in any one of forward and reverse directions. Since the motor 1 (the housing portion 10) also restricts the movement of the impregnant in the radial direction (DR), it is possible to reduce the movement of the impregnant whose movement is restricted by the first protrusion portion 130 or the second protrusion portion 140 beyond the first protrusion portion 130 or the second protrusion portion 140.

The motor 1 of the present embodiment further includes: the first reservoir portion 135 that is formed between the first inner surface 131 and the inside surface portion 120; and the second reservoir portion 145 that is formed between the second inner surface 141 and the inside surface portion 120.

Hence, in the present embodiment, the first reservoir portion 135 and the second reservoir portion 145 restrict the movement of the impregnant in the annular direction C and the radial direction DR. In this way, the motor 1 (the housing portion 10) can suitably reduce the flow of the impregnant out to the outside of the wiring opening portion 110.

In the motor 1 of the present embodiment, the first protrusion portion 130 and the second protrusion portion 140 are arranged so as to sandwich the wiring opening portion 110, the first protrusion portion 130 is inclined to the opposite side to the wiring opening portion 110 with respect to the radial direction DR and the second protrusion portion 140 is inclined to the opposite side to the wiring opening portion 110 with respect to the radial direction DR.

Hence, in the present embodiment, the first protrusion portion 130a and the second protrusion portion 140a are formed in such suitable places as to reduce the flow of the impregnant to the wiring opening portion 110. The first protrusion portion 130a and the second protrusion portion 140a are formed so as to restrict the flow of the impregnant even when the stator 2 is rotated in any one of forward and reverse directions. In this way, the motor 1 (the housing portion 10) can suitably reduce the flow of the impregnant out to the outside of the wiring opening portion 110.

The motor 1 of the present embodiment includes: a plurality of combinations of the first protrusion portion 130 and the second protrusion portion 140 that is arranged so as to be aligned with the first protrusion portion 130 in the annular direction C, the first protrusion portion 130 in the combination is inclined to the side of the second protrusion portion 140 with respect to the radial direction DR and the second protrusion portion 140 in the combination is inclined to the side of the first protrusion portion 130 with respect to the radial direction DR.

Hence, in the present embodiment, the motor 1 (the housing portion 10) includes a plurality of combinations of the first protrusion portion 130 and the second protrusion portion 140 which are inclined so as to face each other in the annular direction C. In this way, since the motor 1 (the housing portion 10) includes the combinations, the impregnant flowing out to the side of the housing portion 10 can be held in the place from which the impregnant flows out, the impregnant is restricted from being moved along the inside surface portion 120 to the side of the wiring opening portion 110 and the accumulation of the impregnant can be reduced.

In the present embodiment, in the motor 1 (the housing portion 10), the first protrusion portion 130 and the second protrusion portion 140 in the combination are formed so as to restrict the flow of the impregnant even when the stator 2 is rotated in any one of forward and reverse directions, and are formed so as to store the impregnant in the space formed with the first inner surface 131, the second inner surface 141 and the inside surface portion 120. In this way, the motor 1 (the housing portion 10) suitably restricts the movement of the impregnant in the annular direction C, and suitably restricts the flow of the impregnant even when the motor 1 (the stator 2) is moved in any one of forward and reverse directions.

Second Embodiment

Figure 4:
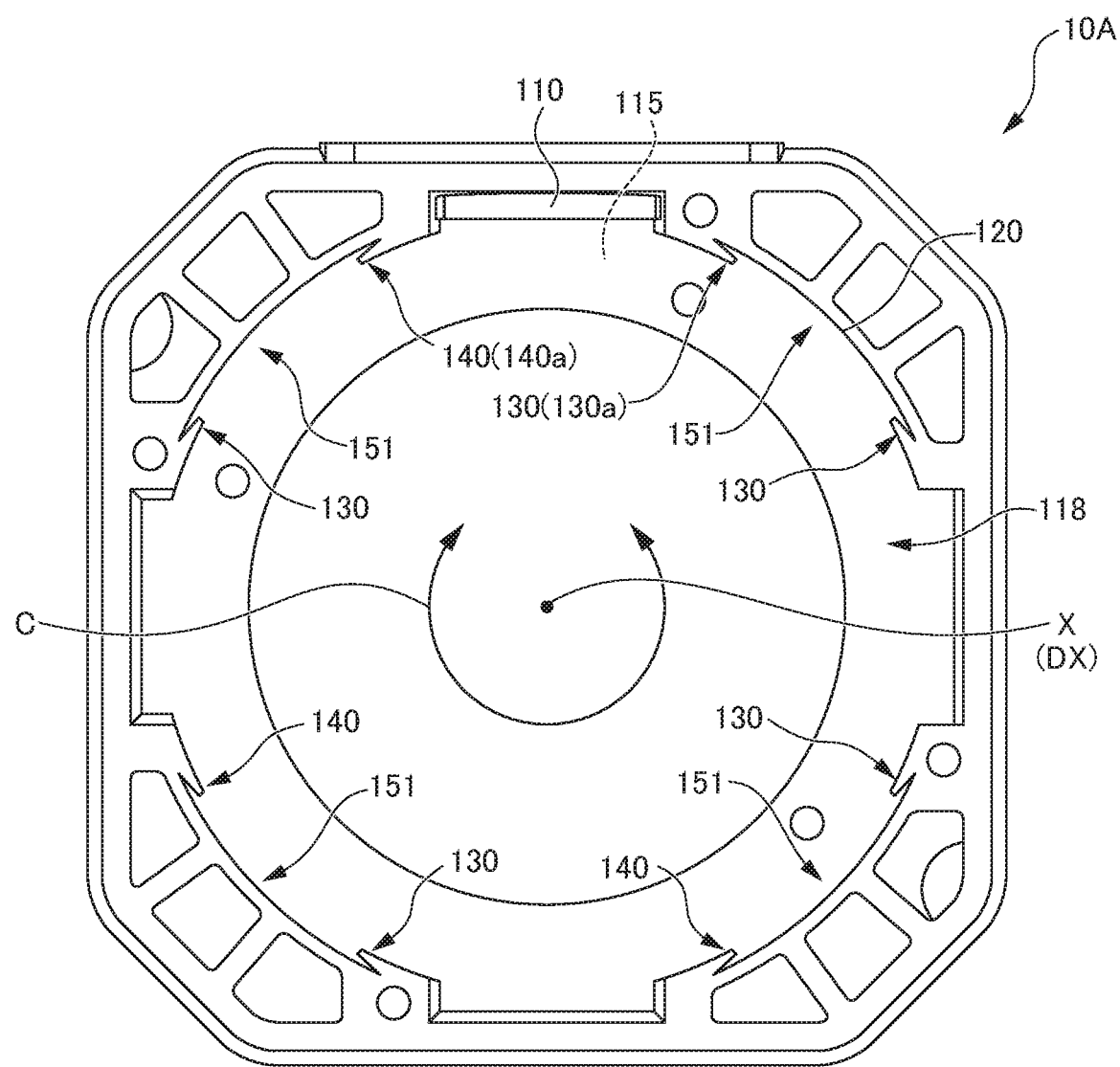
FIG. 4 is a plan view of a housing portion according to a second embodiment.

A housing portion according to the second embodiment will then be described with reference to FIG. 4. FIG. 4 is a plan view of the housing portion according to the second embodiment. Configurations which are different from those in the first embodiment will be described below, and the description of the same configurations will be omitted.

As shown in FIG. 4, in the housing portion 10A of the present embodiment, four combinations of the first protrusion portion 130 and the second protrusion portion 140 are provided. In the present embodiment, the housing portion 10A includes a plurality of combinations of the first protrusion portion 130 and the second protrusion portion 140 which is arranged so as to be aligned with the first protrusion portion 130 in the annular direction C. Specifically, the housing portion 10A includes the four combinations of the first protrusion portion 130 and the second protrusion portion 140 which are inclined so as to face each other in the annular direction C.

In the present embodiment, the first protrusion portion 130*a* and the second protrusion portion 140*a* are arranged in the vicinity of the wiring opening portion 110 so as to sandwich the wiring opening portion 110. The first protrusion portion 130*a* and the second protrusion portion 140*a* are formed in such suitable places as to reduce the flow of the impregnant to the wiring opening portion 110.

In the present embodiment, an inflow port 151 which is formed between the tip portions of the first protrusion portion 130 and the second protrusion portion 140 in the combination has a wider opening width than the inflow port 150 in the first embodiment.

According to the present embodiment, in addition to the effects in the embodiment described above, the following effects are produced. In the present embodiment, the motor 1 (the housing portion 10A) includes a plurality of combinations of the first protrusion portion 130 and the second protrusion portion 140 which are inclined so as to face each other in the annular direction C. In this way, since the motor 1 (the housing portion 10A) includes the combinations, the impregnant flowing out to the side of the housing portion 10 can be held in the place from which the impregnant flows out, the impregnant is restricted from being moved along the inside surface portion 120 to the side of the wiring opening portion 110 and the accumulation of the impregnant can be reduced.

In the present embodiment, the first protrusion portion 130*a* and the second protrusion portion 140*a* are formed in such suitable places as to reduce the flow of the impregnant to the wiring opening portion 110. The first protrusion portion 130*a* and the second protrusion portion 140*a* are formed so as to restrict the flow of the impregnant even when the stator 2 is rotated in any one of forward and reverse directions. In this way, the motor 1 (the housing portion 10A) can suitably reduce the flow of the impregnant out to the outside of the wiring opening portion 110.

In the present embodiment, the inflow port 151 which is formed between the tip portions of the first protrusion portion 130 and the second protrusion portion 140 in the combination has a wider opening width than the inflow port 150 in the first embodiment, and thus the impregnant easily flows in.

In the present embodiment, since a small number of first protrusion portions 130 and second protrusion portions 140 are provided, the manufacturing of the housing portion 10 is excellent.

Third Embodiment

Figure 5:
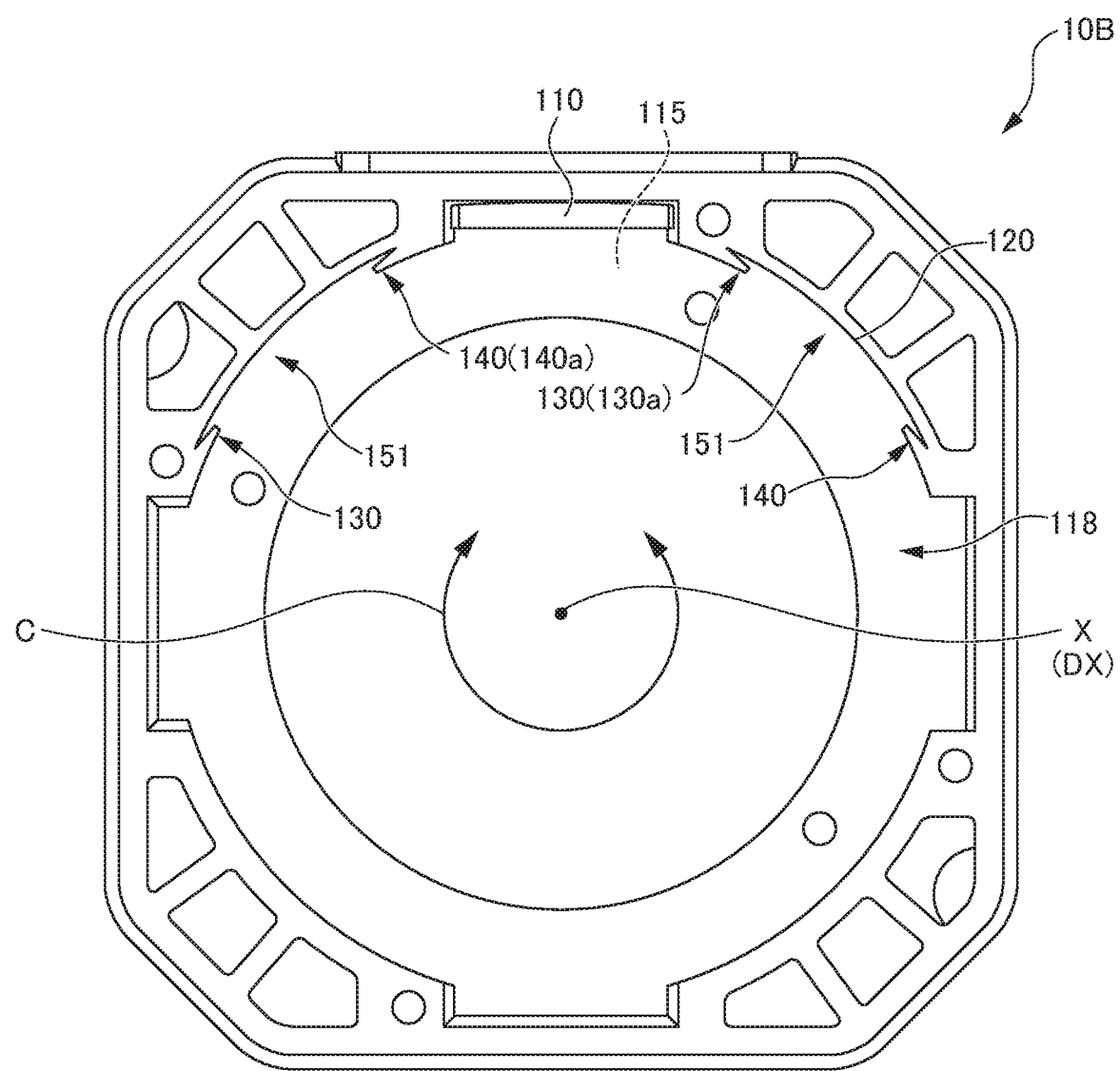
FIG. 5 is a plan view of a housing portion according to a third embodiment.

A housing portion according to the third embodiment will then be described with reference to FIG. 5. FIG. 5 is a plan view of the housing portion according to the third embodiment. Configurations which are different from those in the embodiments discussed above will be described below, and the description of the same configurations will be omitted.

As shown in FIG. 5, in the housing portion 10B of the present embodiment, two combinations of the first protrusion portion 130 and the second protrusion portion 140 are provided, and the two combinations are formed so as to sandwich the wiring opening portion 110.

In the present embodiment, the housing portion 10B includes a plurality of combinations of the first protrusion portion 130 and the second protrusion portion 140 which is arranged so as to be aligned with the first protrusion portion 130 in the annular direction C. The housing portion 10 includes the two combinations of the first protrusion portion 130 and the second protrusion portion 140 which are inclined so as to face each other in the annular direction C. Here, the combinations are formed so as to sandwich the wiring opening portion 110.

In the present embodiment, the first protrusion portion 130*a* and the second protrusion portion 140*a* are arranged in the vicinity of the wiring opening portion 110 so as to sandwich the wiring opening portion 110. The first protrusion portion 130*a* and the second protrusion portion 140*a* are formed in such suitable places as to reduce the flow of the impregnant to the wiring opening portion 110.

In the present embodiment, the inflow port 151 which is formed between the tip portions of the first protrusion portion 130 and the second protrusion portion 140 in the combination has a wider opening width than the inflow port 150 in the first embodiment. The inflow port 151 is not present in the half circumferential part on the opposite side to the wiring opening portion 110 in the annular direction C.

According to the present embodiment, in addition to the effects in the embodiments described above, the following effects are produced. In the present embodiment, the motor (the housing portion 10B) includes a plurality of combinations of the first protrusion portion 130 and the second protrusion portion 140 which are inclined so as to face each other in the annular direction C. The combinations are formed so as to sandwich the wiring opening portion 110. In this way, since the motor (the housing portion 10B) includes the two combinations, and the combinations are formed so as to sandwich the wiring opening portion 110, the impregnant flowing out to the side of the housing portion 10B can be held in the place from which the impregnant flows out, the impregnant is restricted from being moved along the inside surface portion 120 to the side of the wiring opening portion 110 and the accumulation of the impregnant can be reduced.

In the present embodiment, the first protrusion portion 130*a* and the second protrusion portion 140*a* are formed in such suitable places as to reduce the flow of the impregnant to the wiring opening portion 110. The first protrusion portion 130*a* and the second protrusion portion 140*a* are formed so as to restrict the flow of the impregnant even when the stator 2 is rotated in any one of forward and reverse directions. In this way, the motor (the housing portion 10B) can suitably reduce the flow of the impregnant out to the outside of the wiring opening portion 110.

In the present embodiment, since a smaller number of first protrusion portions 130 and second protrusion portions 140 are provided, the manufacturing of the housing portion 10 is more excellent.

Fourth Embodiment

Figure 6:
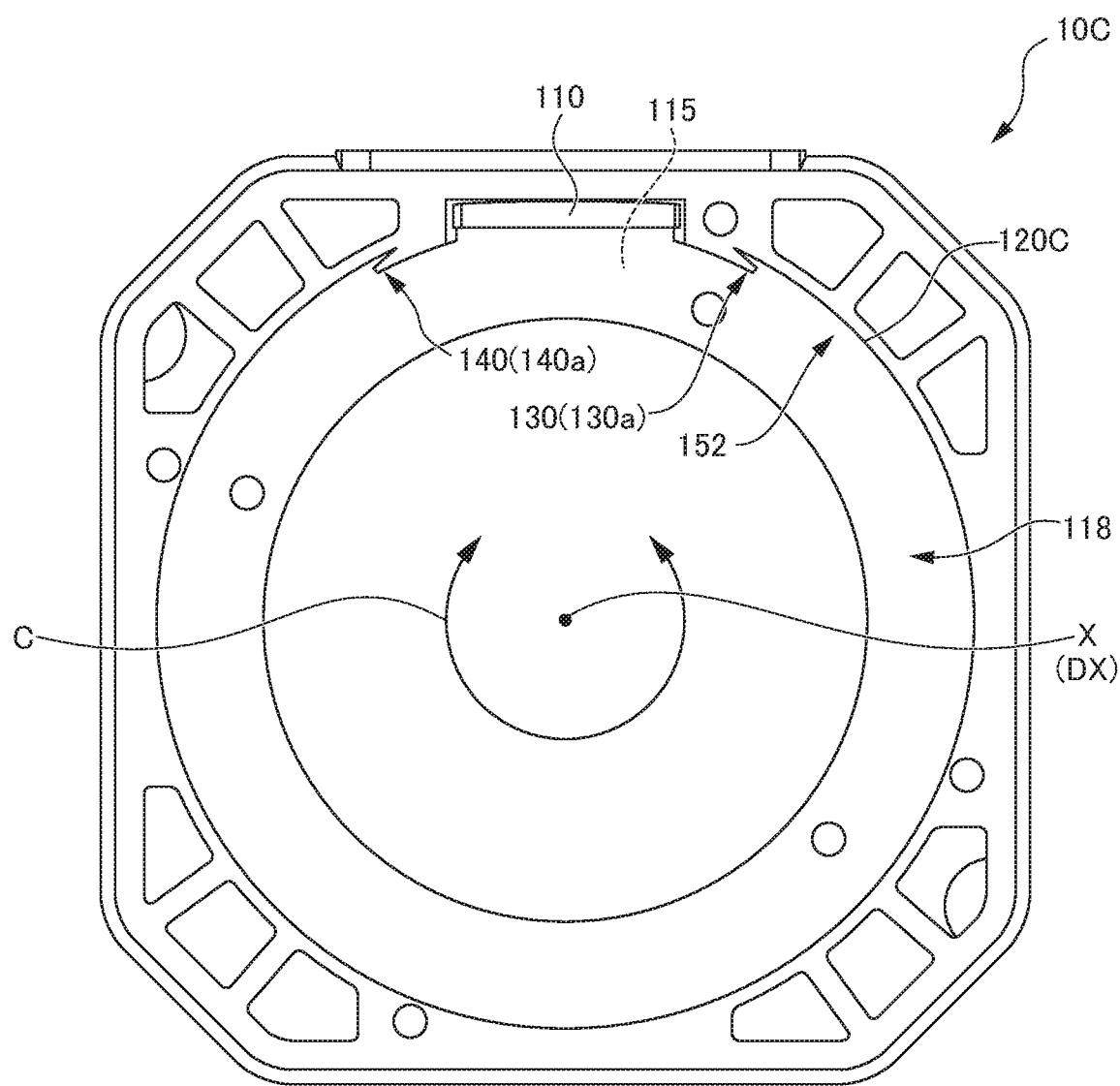
FIG. 6 is a plan view of a housing portion according to a fourth embodiment.

A housing portion according to the fourth embodiment will then be described with reference to FIG. 6. FIG. 6 is a plan view of the housing portion according to the fourth embodiment. Configurations which are different from those in the embodiments discussed above will be described below, and the description of the same configurations will be omitted.

As shown in FIG. 6, in the housing portion 10C of the present embodiment, one combination of the first protrusion portion 130 and the second protrusion portion 140 is provided, and the first protrusion portion 130*a* and the second protrusion portion 140*a* are formed so as to sandwich the wiring opening portion 110.

In the present embodiment, the first protrusion portion 130*a* and the second protrusion portion 140*a* are arranged in the vicinity of the wiring opening portion 110 so as to sandwich the wiring opening portion 110. The first protrusion portion 130*a* and the second protrusion portion 140*a* are formed in such suitable places as to reduce the flow of the impregnant to the wiring opening portion 110.

In the present embodiment, an inflow port 152 which is formed between the tip portions of the first protrusion portion 130 and the second protrusion portion 140 in the combination is, in the annular direction C, all regions except the first protrusion portion 130, the second protrusion portion 140 and the wiring opening portion 110.

According to the present embodiment, in addition to the effects in the embodiments described above, the following effects are produced. In the present embodiment, the first protrusion portion 130*a* and the second protrusion portion 140*a* are formed in such suitable places as to reduce the flow of the impregnant to the wiring opening portion 110. The first protrusion portion 130*a* and the second protrusion portion 140*a* are formed so as to restrict the flow of the impregnant even when the stator 2 is rotated in any one of forward and reverse directions. In this way, the motor (the housing portion 10C) can suitably reduce the flow of the impregnant out to the outside of the wiring opening portion 110.

In the present embodiment, since the smallest number (one combination) of the first protrusion portion 130*a* and the second protrusion portion 140*a* are provided, the manufacturing of the housing portion is most excellent. This configuration is a configuration in which modifications from the conventional configuration are most minimized, and thus this configuration is suitable in terms of the design and the manufacturing process.

Fifth Embodiment

Figure 7:
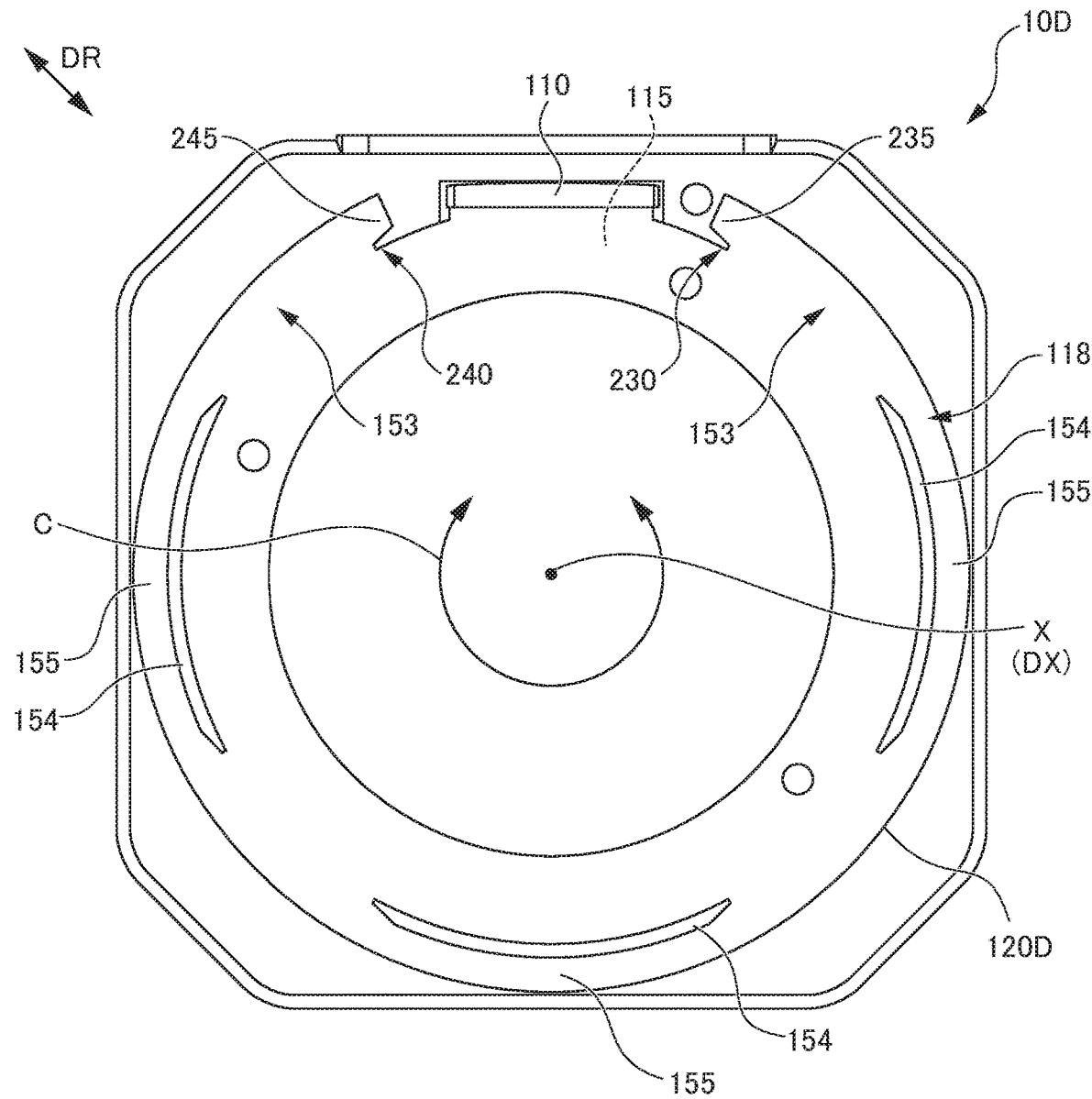
FIG. 7 is a plan view of a housing portion according to a fifth embodiment.

A housing portion according to the fifth embodiment will then be described with reference to FIG. 7. FIG. 7 is a plan view of the housing portion according to the fifth embodiment. Configurations which are different from those in the embodiments discussed above will be described below, and the description of the same configurations will be omitted.

As shown in FIG. 7, in the housing portion 10D of the present embodiment, one combination of the first protrusion portion 130 and the second protrusion portion 140 is provided, and the first protrusion portion 130 and the second protrusion portion 140 are formed so as to sandwich the wiring opening portion 110. In the housing portion 10D of the present embodiment, air vents for air cooling which are formed in an outer circumferential portion are not present, and thus an inside surface portion 120D is formed outward in the radial direction as compared with the embodiments described above. In this way, in the housing portion 10D of the present embodiment, the capacities of a first reservoir portion 235 and a second reservoir portion 245 are increased.

In the present embodiment, a first protrusion portion 230 and a second protrusion portion 240 are arranged in the vicinity of the wiring opening portion 110 so as to sandwich the wiring opening portion 110. The first protrusion portion 230 and the second protrusion portion 240 are formed in such suitable places as to reduce the flow of the impregnant to the wiring opening portion 110.

The first protrusion portion 230 and the second protrusion portion 240 are formed so as to be longer (deeper) in the radial direction DR than in the embodiments described above, and thus the capacities are increased.

In the present embodiment, three guide wall portions 154 are formed so as to be separated in the annular direction C. The guide wall portions 154 are formed along the position in which the inside surface portion 120 is formed in the embodiments described above. The guide wall portions 154 form, together with the inside surface portion 120D, a guide portion 155 which guides the impregnant. Inflow ports 153 are formed between the guide wall portion 154 and each of the first protrusion portion 230, the second protrusion portion 240 and the other guide wall portions 154 which are adjacent in the annular direction C.

According to the present embodiment, in addition to the effects in the embodiments described above, the following effects are produced. In the present embodiment, the first protrusion portion 230 and the second protrusion portion 240 are formed in such suitable places as to reduce the flow of the impregnant to the wiring opening portion 110. The first protrusion portion 230 and the second protrusion portion 240 are formed so as to restrict the flow of the impregnant even when the stator 2 is rotated in any one of forward and reverse directions. In this way, the motor (the housing portion 10D) can suitably reduce the flow of the impregnant out to the outside of the wiring opening portion 110.

In the present embodiment, the first protrusion portion 230 and the second protrusion portion 240 are formed so as to be longer (deeper) in the radial direction DR than in the embodiments described above, and thus the capacities are increased. In this way, the motor (the housing portion 10D) can reduce the flow of the impregnant out to the side of the wiring opening portion 110 even when a large amount of impregnant flows out from the winding portions 20.

Sixth Embodiment

Figure 8:
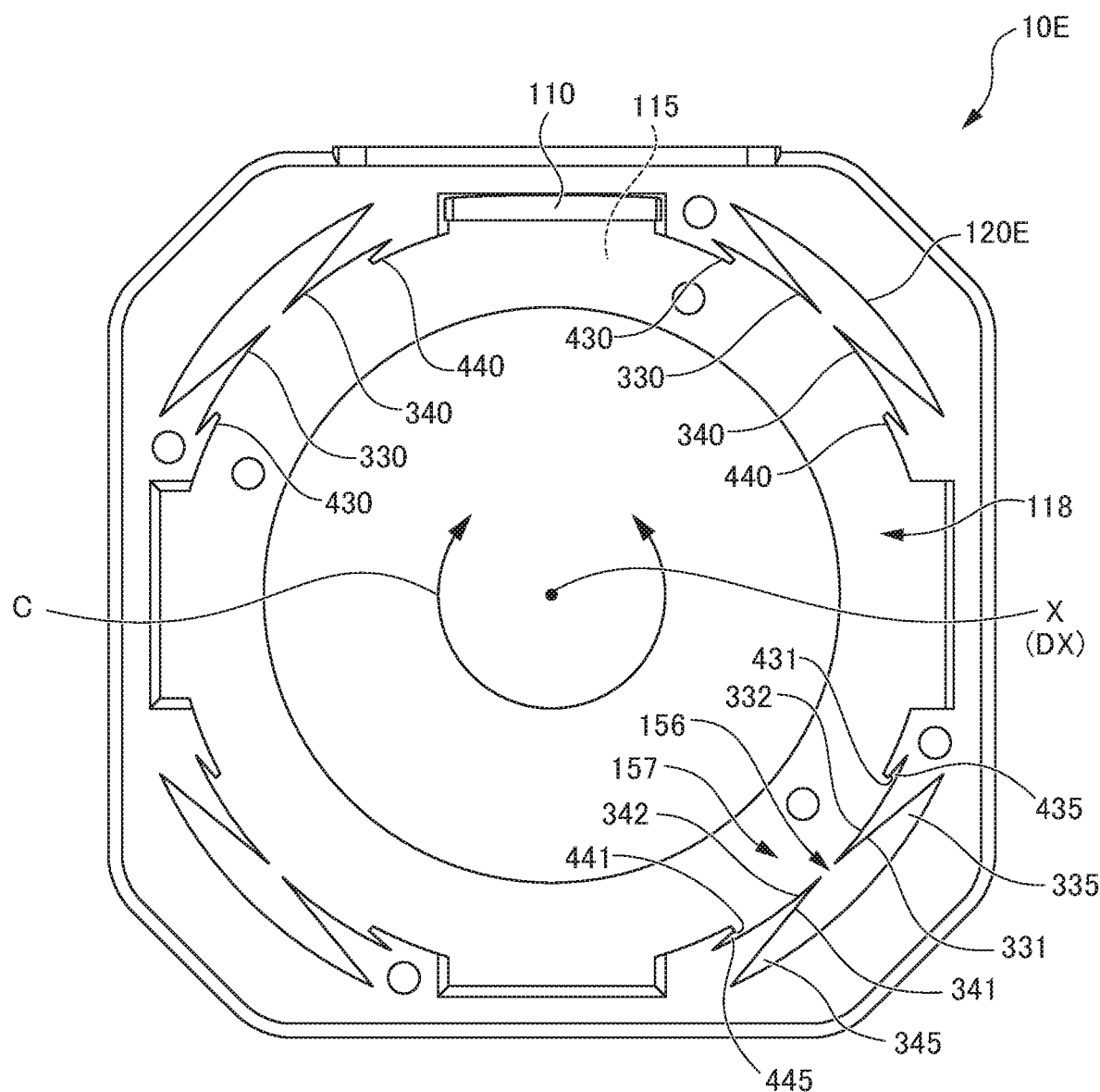
FIG. 8 is a plan view of a housing portion according to a sixth embodiment.

A housing portion according to the sixth embodiment will then be described with reference to FIG. 8. FIG. 8 is a plan view of the housing portion according to the sixth embodiment. Configurations which are different from those in the embodiments discussed above will be described below, and the description of the same configurations will be omitted.

As shown in FIG. 8, in the housing portion 10E of the present embodiment, the air vents for air cooling which are formed in the outer circumferential portion are not present, and thus an inside surface portion 120E is formed outward in the radial direction DR as compared with the embodiments described above. The housing portion 10E of the present embodiment includes a third protrusion portion 430 and a fourth protrusion portion 440 which are respectively aligned with a first protrusion portion 330 and a second protrusion portion 340 in the radial direction DR. In the present embodiment, the individual protrusion portions (combinations) are formed in two stages in the radial direction DR.

The housing portion 10E of the present embodiment includes, in addition to a plurality of first protrusion portions 330 and a plurality of second protrusion portions 340, a plurality of third protrusion portions 430 and a plurality of fourth protrusion portions 440.

The third protrusion portion 430 is arranged on a center side in the radial direction DR with respect to the first protrusion portion 330. The third protrusion portion 430 is formed so as to be protruded toward the side of the rotary axis X, and is formed so as to be inclined to the same side as the first protrusion portion 330 with respect to the radial direction DR. The fourth protrusion portion 440 is arranged on the center side in the radial direction DR with respect to the second protrusion portion 340. The fourth protrusion portion 440 is formed so as to be protruded toward the side of the rotary axis X, and is formed so as to be inclined to the same side as the second protrusion portion 340 with respect to the radial direction DR.

The housing portion 10E of the present embodiment includes a plurality of first inflow ports 156 and a plurality of second inflow ports 157. In the present embodiment, the length of the second inflow port 157 in the annular direction C is longer (wider) than that of the first inflow port 156 in the annular direction C.

The housing portion 10E of the present embodiment includes, in addition a plurality of first reservoir portions 335 and a plurality of second reservoir portions 345, a plurality of third reservoir portions 435 and a plurality of fourth reservoir portions 445.

The third reservoir portion 435 is formed with the first outer surface 332 of the first protrusion portion 330 and the third inner surface 431 of the third protrusion portion 430. The fourth reservoir portion 445 is formed with the second outer surface 342 of the second protrusion portion 340 and the fourth inner surface 441 of the fourth protrusion portion 440. Here, the first reservoir portion 335 and the third reservoir portion 435 are formed so as to aligned in the radial direction DR. The second reservoir portion 345 and the fourth reservoir portion 445 are formed so as to be aligned in the radial direction DR.

The housing portion 10E of the present embodiment includes a plurality of two-stage combinations each of which is formed with: a first combination of the first protrusion portion 330 and the second protrusion portion 340; and a second combination of the third protrusion portion 430 and the fourth protrusion portion 440 that is arranged so as to be aligned on the side of the rotary axis X in the radial direction DR with respect to the first combination. The two-stage combinations (in the present embodiment, the four combinations) are arranged so as to be aligned in the annular direction C.

According to the present embodiment, in addition to the effects in the embodiments described above, the following effects are produced. The motor of the present embodiment further includes: the third protrusion portion 430 which is arranged on the center side in the radial direction DR with respect to the first protrusion portion 330, which is formed so as to be protruded toward the side of the rotary axis X and which is formed so as to be inclined to the same side as the first protrusion portion 330 with respect to the radial direction DR; and the fourth protrusion portion 440 which is arranged on the center side in the radial direction DR with respect to the second protrusion portion 340, which is formed so as to be protruded toward the side of the rotary axis X and which is formed so as to be inclined to the same side as the second protrusion portion 340 with respect to the radial direction DR.

Hence, in the present embodiment, the motor (the housing portion 10E) includes the two (two-stage) protrusion portions aligned in the radial direction DR. In this way, the motor (the housing portion 10E) suitably reduces the movement of the impregnant in the annular direction C.

In the present embodiment, the motor (the housing portion 10E) includes the two-stage combinations each of which is formed with: the first combination of the first protrusion portion 330 and the second protrusion portion 340; and the second combination of the third protrusion portion 430 and the fourth protrusion portion 440 that is arranged so as to be aligned on the side of the rotary axis X in the radial direction DR with respect to the first combination.

In this way, the motor (the housing portion 10E) is formed so as to restrict the flow of the impregnant even when the stator 2 is rotated in any one of forward and reverse directions. In this way, the motor (the housing portion 10E) can suitably reduce the flow of the impregnant out to the outside of the wiring opening portion 110.

In the present embodiment, the motor (the housing portion 10E) includes a plurality of two-stage combinations described above. In this way, since the motor (the housing portion 10E) includes the two-stage combinations, the impregnant flowing out to the side of the housing portion 10E can be held in the place from which the impregnant flows out, the impregnant is restricted from being moved along the inside surface portion 120E to the side of the wiring opening portion 110 and the accumulation of the impregnant can be reduced.

[First Variation]

Figure 9:
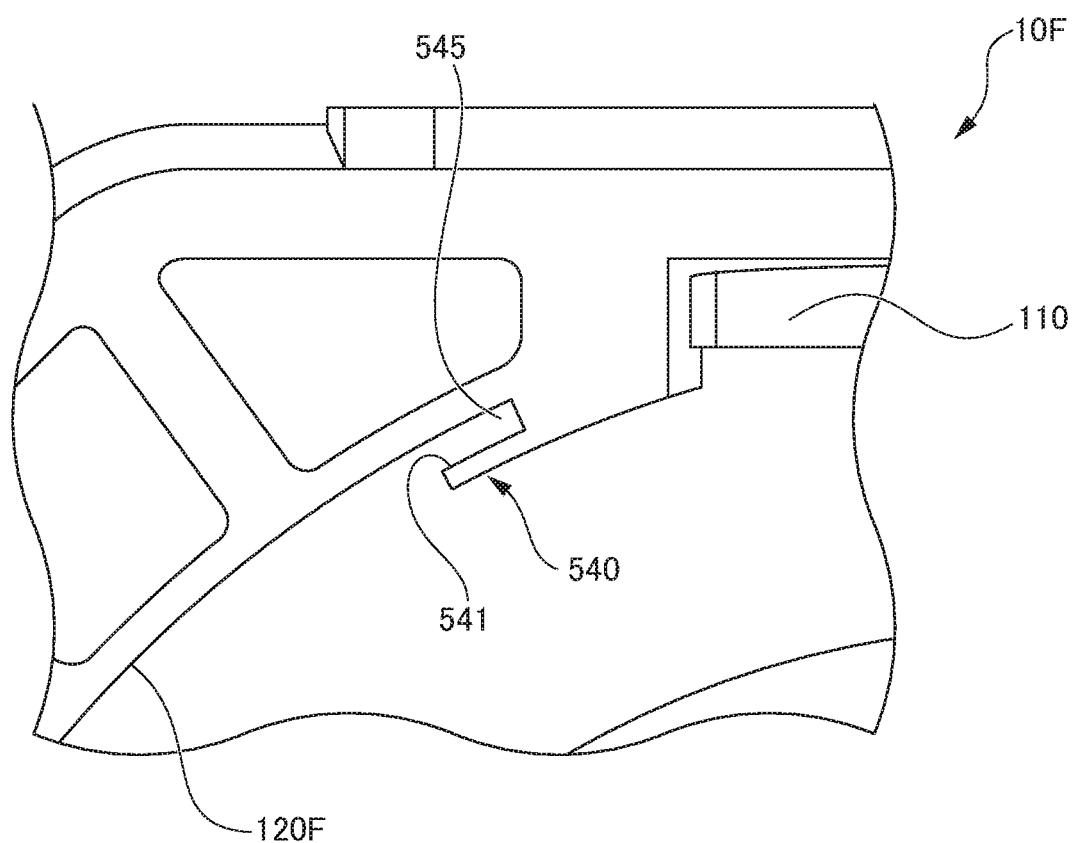
FIG. 9 is a partially enlarged view of a second protrusion portion according to a first variation.

A housing portion according to a first variation will then be described with reference to FIG. 9. FIG. 9 is a partially enlarged view of a second protrusion portion according to the first variation. Configurations which are different from those in the embodiments discussed above will be described below, and the description of the same configurations will be omitted.

As shown in FIG. 9, the housing portion 10F of the first variation differs from the embodiments described above in the shape of the protrusion portion and the shape of the reservoir portion. Although here, in the present variation, a description will be given of a second protrusion portion 540 and a second reservoir portion 545, the description can be utilized for a first protrusion portion and a first reservoir portion.

As shown in FIG. 9, in the second protrusion portion 540 in the housing portion 10F of the present variation, a second inner surface 541 is arranged substantially parallel to an inside surface portion 120F. In this way, the second reservoir portion 545 is formed so as to be extended in the annular direction C, and is formed such that the end surface (the surface on the side of the wiring opening portion 110) in the annular direction C is substantially perpendicular to the annular direction C. In this way, the capacity of the second reservoir portion 545 is increased.

[Second Variation]

Figure 10:
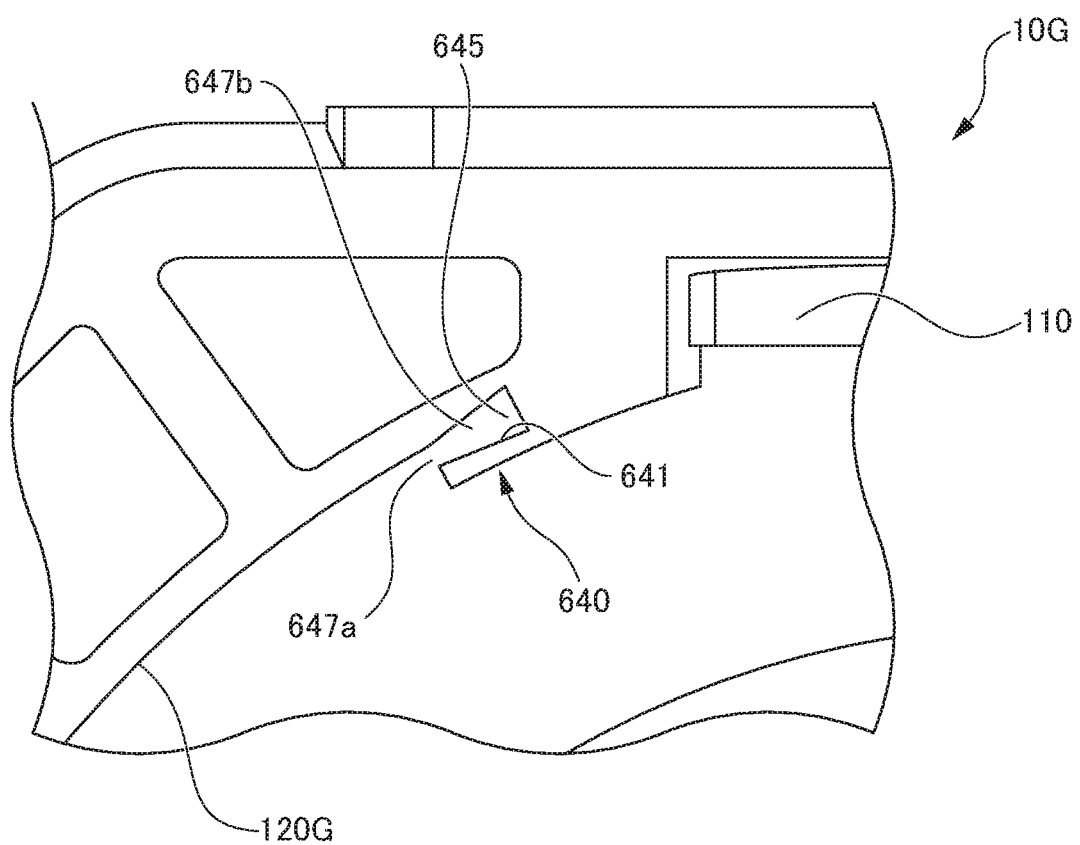
FIG. 10 is a partially enlarged view of a second protrusion portion according to a second variation.

A housing portion according to a second variation will then be described with reference to FIG. 10. FIG. 10 is a partially enlarged view of a second protrusion portion according to the second variation. Configurations which are different from those in the embodiments discussed above will be described below, and the description of the same configurations will be omitted.

As shown in FIG. 10, as in the first variation, the housing portion 10G of the second variation differs from the embodiments described above in the shape of the protrusion portion and the shape of the reservoir portion. Although here, in the present variation, a description will be given of a second reservoir portion 645, the description can be utilized for a first reservoir portion.

As shown in FIG. 10, the second reservoir portion 645 in the housing portion G of the present variation is formed so as to be extended in the annular direction C, and is formed such that as the second reservoir portion 645 is extended to the back side in the annular direction C, the length in the radial direction DR is increased. In other words, the second reservoir portion 645 is formed such that the length of an entrance portion 647a in the radial direction DR is shorter (narrower) than the length of an inside 647b in the radial direction DR.

The second reservoir portion 645 is formed such that the capacity of the inside 647b is increased and that the width of the entrance portion 647a is narrowed. In this way, the second reservoir portion 645 has such a structure that the capacity of the inside 647b is increased and that the impregnant stored in the inside 647b is unlikely to flow out to the outside.

The present invention is not limited to the embodiments described above, and variations and modifications are included in the present invention as long as the object of the present invention can be achieved.

EXPLANATION OF REFERENCE NUMERALS 1 motor
2 stator
3 rotor
10, 10A, 10B, 10C, 10D, 10E, 10F housing portion
20 winding portion
21 first internal space
110 wiring opening portion (opening portion)
115 second internal space
118 end surface portion
120 inside surface portion
130, 230, 330 first protrusion portion
131 first inner surface
135 first reservoir portion
140, 240, 340, 540, 640 second protrusion portion
141 second inner surface
145 second reservoir portion
430 third protrusion portion
440 fourth protrusion portion
C annular direction
DX rotary axis direction
DR radial direction
X rotary axis

What is claimed is:

1. A motor comprising:
a cylindrical stator that includes: a cylindrical first internal space; and a plurality of winding portions which are arranged so as to form an outer circumference of the first internal space;
a rotor that includes: a rotary axis portion which can be rotated about a rotary axis and which is arranged along the rotary axis; and a rotary main body portion at least part of which is arranged in the first internal space of the stator; and
a housing portion that is arranged on one end side of the stator in a rotary axis direction in which the rotary axis is extended, wherein
the housing portion includes:
an end surface portion that is arranged on the one end side in the rotary axis direction perpendicularly to the rotary axis;
an inside surface portion that is formed so as to be extended from the end surface portion to the other end side in the rotary axis direction and that is arranged about the rotary axis in an annular direction either continuously or intermittently;
an opening portion that is arranged so as to be aligned with part of the inside surface portion in the annular direction and that makes a second internal space formed with the end surface portion and the inside surface portion and an external space communicate with each other;
a first protrusion portion that is formed so as to be protruded from the inside surface portion toward a side of the rotary axis and that is formed so as to be inclined to one side in the annular direction with respect to a radial direction perpendicular to the rotary axis direction;
a second protrusion portion that is formed so as to be protruded from the inside surface portion toward the side of the rotary axis and that is formed so as to be inclined to the other side in the annular direction with respect to the radial direction; and
each of the first protrusion portion and the second protrusion includes a surface that extends along the axial direction of the rotor and extends along the annular direction of the rotor, such that the end surface portion extends further, in the radial direction, towards a center of the rotary axis than the surface of the first protrusion portion and second protrusion portion.

2. The motor according to claim 1, wherein the first protrusion portion is arranged in a position relationship in which at least part of a first inner surface, that is an inclined side surface, intersects the inside surface portion at an acute angle, and
the second protrusion portion is arranged in a position relationship in which at least part of a second inner surface, that is an inclined side surface, intersects the inside surface portion at an acute angle.

3. The motor according to claim 2, further comprising:
a first reservoir portion that is formed between the first inner surface and the inside surface portion; and
a second reservoir portion that is formed between the second inner surface and the inside surface portion.

4. The motor according to claim 1, wherein the first protrusion portion and the second protrusion portion are arranged so as to sandwich the opening portion,
the first protrusion portion is inclined to an opposite side of the opening portion with respect to the radial direction; and
the second protrusion portion is inclined to the opposite side of the opening portion with respect to the radial direction.

5. The motor according to claim 1, comprising:
a plurality of combinations of the first protrusion portion and the second protrusion portion that is arranged so as to be aligned with the first protrusion portion in the annular direction, wherein
each first protrusion portion is inclined to a side of the respective second protrusion portion with respect to the radial direction, and
each second protrusion portion is inclined to a side of the respective first protrusion portion with respect to the radial direction.

6. The motor according to claim 1 further comprising:
a third protrusion portion that is arranged to be closer to the center in the radial direction with respect to the first protrusion portion, that is formed so as to be protruded toward the side of the rotary axis and that is formed so as to be inclined to the same side as the first protrusion portion with respect to the radial direction; and
a fourth protrusion portion that is arranged to be closer to the center in the radial direction with respect to the second protrusion portion, that is formed so as to be protruded toward the side of the rotary axis and that is formed so as to be inclined to the same side as the second protrusion portion with respect to the radial direction.

7. The motor according to claim 1, wherein
the first protrusion and the second protrusion do not radially overlap with the stator.

8. The motor according to claim 1, wherein
the housing portion is arranged only on one end side of the stator in the rotary axis direction.

9. The motor according to claim 1, further comprising:
a casing that includes
   a first casing portion provided on a first end side of the stator in the rotary axis direction;
   a second casing portion provided adjacent to the first casing portion in the rotary axis direction; and
   the housing portion provided on a second end side of the stator in the rotary axis direction, wherein
the first casing portion and the housing portion are arranged on opposite end sides of the stator in the rotary axis direction.

\* \* \* \* \*